Sept. 8, 1964  R. L. ERWIN  3,147,642
MULTIPLE DISC CLUTCH OR BRAKE ASSEMBLY
Filed July 17, 1959  2 Sheets-Sheet 1
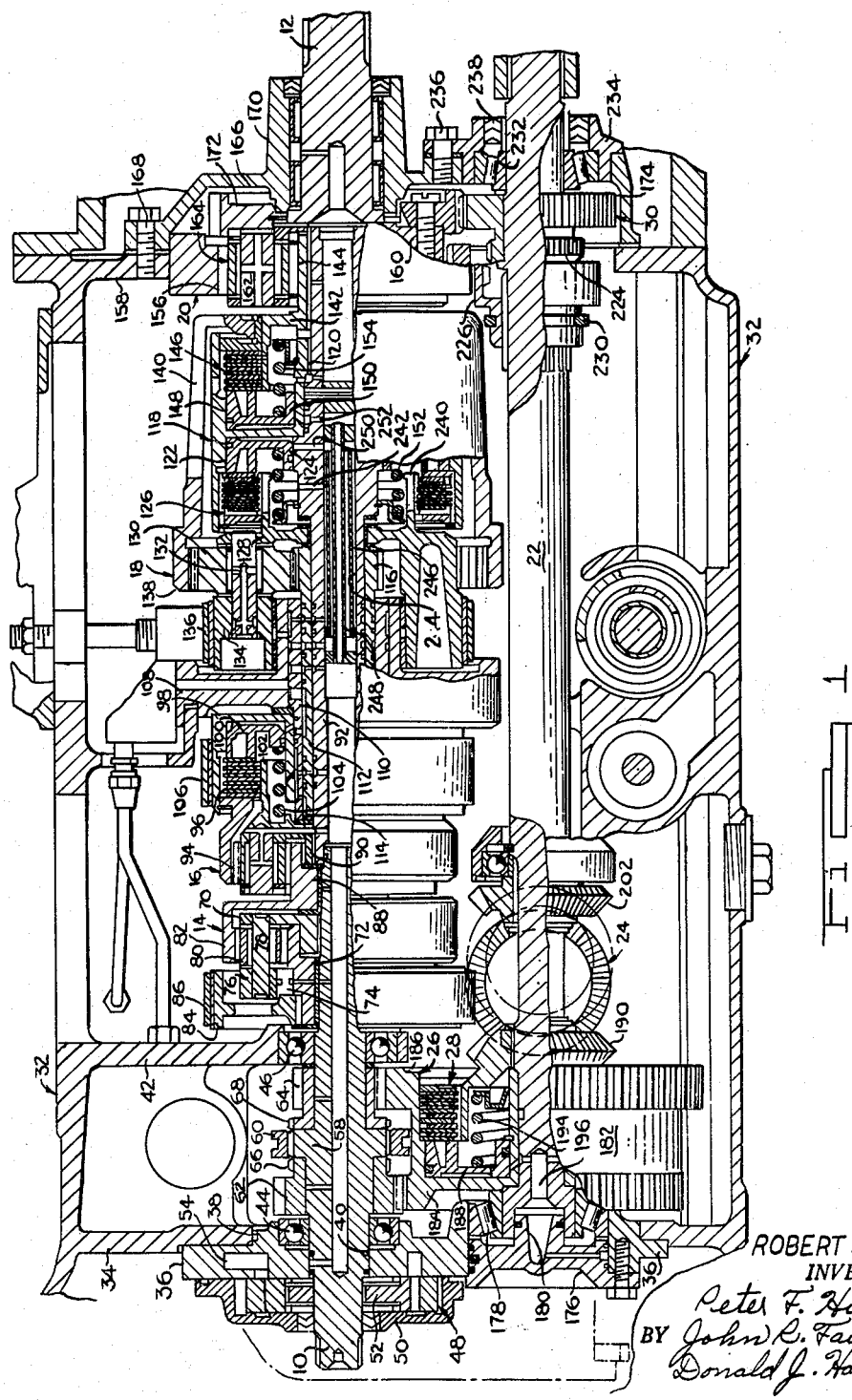
ROBERT L. ERWIN
INVENTOR.
BY Peter F. Hilder
John R. Faulkner
Donald J. Harrington
ATTORNEYS Sept. 8, 1964 R. L. ERWIN 3,147,642
MULTIPLE DISC CLUTCH OR BRAKE ASSEMBLY
Filed July 17, 1959 2 Sheets-Sheet 2
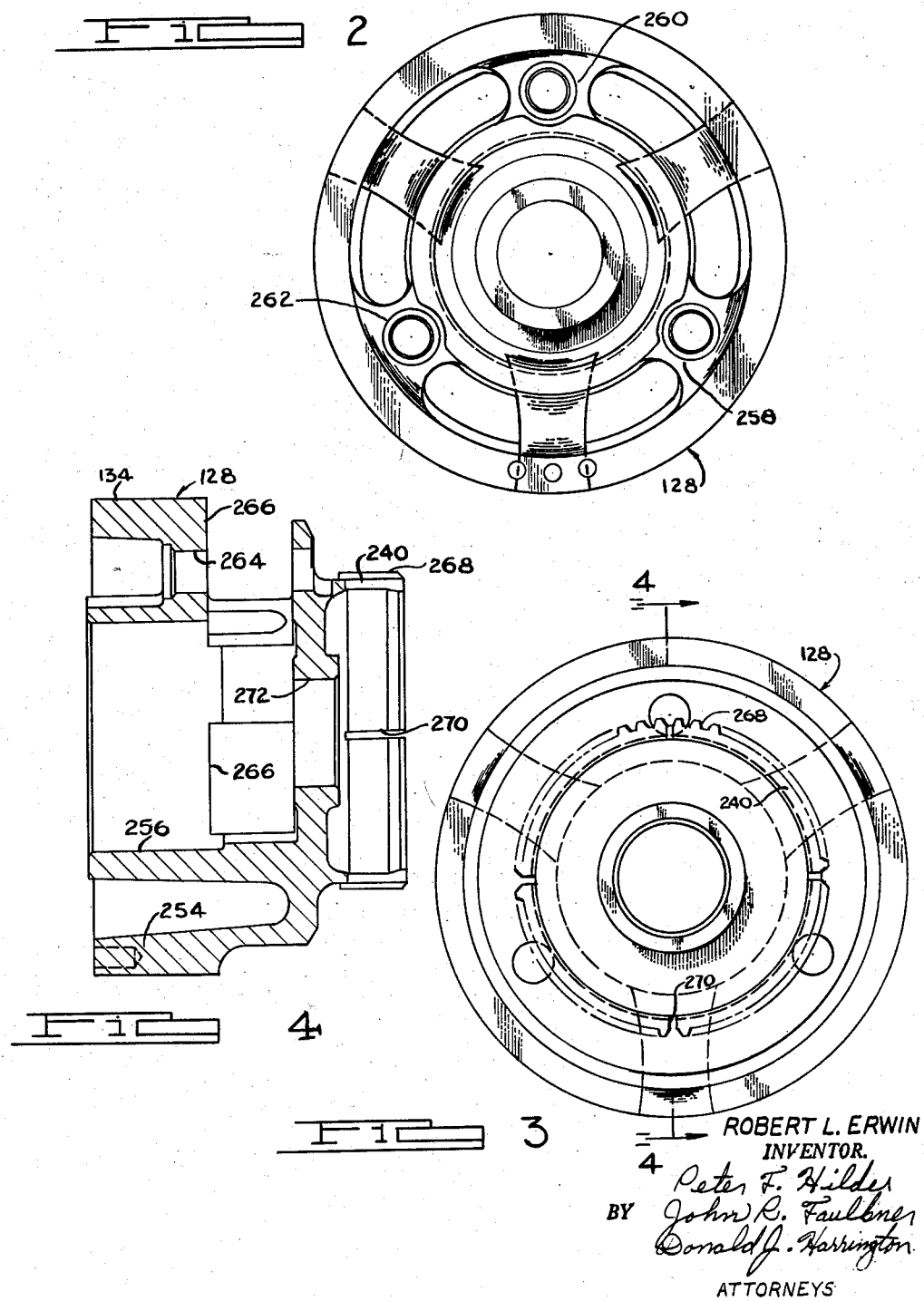
ROBERT L. ERWIN
INVENTOR.
BY Peter F. Hilder
John R. Faulkner
Donald J. Harrington
ATTORNEYS

United States Patent Office 3,147,642
Patented Sept. 8, 1964

3,147,642
MULTIPLE DISC CLUTCH OR BRAKE ASSEMBLY
Robert L. Erwin, Birmingham, Mich., assignor to Ford Motor Company, Dearborn, Mich., a corporation of Delaware
Filed July 17, 1959, Ser. No. 827,757
3 Claims. (Cl. 74—759)

My invention relates generally to torque transmitting devices and more particularly to a new and improved clutch or brake structure.

I contemplate that my invention may be readily applied to the clutches or brakes of a multiple speed power transmission mechanism having a torque delivery gear train wherein the relative motion of the gear elements of the gear train is controlled with multiple disc clutches or brakes.

In one operating environment for my invention a plurality of planetary gear units is employed for establishing multiple torque delivery paths of varying torque multiplication ratio and various transmission control clutches and brakes may be applied and released in sequence to effect the various shifts from one transmission ratio to another. The motion of the gear elements of one of the planetary gear units is controlled by a brake and by a multiple disc clutch, and one portion of the clutch is connected to one portion of the brake for establishing common, conjoint motion. These common clutch and brake portions are anchored to a stationary part of the transmission casing when the brake is applied and the clutch is released, and they rotate in unison when the clutch is applied and the brake is released.

During operation of the transmission mechanism in those speed ratios which require the aforementioned brake to be applied and the aforementioned clutch to be released, relative motion takes place between the adjacent clutch discs since alternate discs are directly connected to a driven portion of the mechanism and the other adjacent discs are positively connected to the braked portions of the clutch structure. This relative motion between the clutch discs causes a certain amount of frictional drag, and it is therefore necessary to maintain an adequate supply of lubricating oil in this region of the clutch. This is accomplished in my instant invention by providing lubricating oil passages at a radially inward location in the clutch hub.

The clutch structure above described includes a drum portion capable of drivably supporting clutch discs of the clutch disc assembly, and according to a preferred embodiment of my invention it is integrally formed in a part of the associated brake. The drum portion is formed with a hollow interior which communicates with the aforementioned lubricating oil passages, and elongated openings or slots are formed in the periphery of the clutch drum portion for the purpose of allowing the lubricating oil to reach the passages of the clutch disc. When the oil reaches the clutch discs in this fashion, the oil is distributed over the surfaces of the clutch discs by reason of the relative rotation of the the same. In this way overheating of the clutch discs and premature clutch failure due to frictional drag is avoided.

The provision of an improved clutch or brake structure of the type above set forth being a principal object of my invention, it is a further object of my invention to provide a lubricating means for a multiple clutch disc assembly capable of uniformly lubricating the entire surfaces of the clutch discs.

It is a further object of my invention to provide a clutch mechanism for a multiple speed power transmission mechanism wherein one of the movable clutch portions is adapted to be braked during operation in one speed range and wherein means are provided for lubricating the passages of the clutch discs when this braked condition is established.

It is a further object of my invention to provide an improved clutch structure of the type above set forth wherein the clutch disc lubrication means may be formed by simplified and conventional manufacturing techniques.

I have applied my improved clutch or brake structure to a multiple speed power transmission mechanism for use with agricultural tractors, and this is the preferred arrangement herein disclosed. However, I contemplate that the teachings of my instant invention may also be applied to a variety of other transmisison mechanisms.

For the purpose of particularly describing my invention as applied to a ten-speed agricultural tractor transmission mechanism, reference will be made to the accompany drawings wherein:

FIGURE 1 is a cross sectional assembly view of a ten-speed semi-automatic power transmission mechanism embodying my invention;

FIGURE 2 is an end view of a carrier assembly for one of the planetary gear units shown in FIGURE 1;

FIGURE 3 is another end view of the assembly of FIGURE 2 as viewed from the side opposite to the view of FIGURE 2; and FIGURE 4 is a longitudinal cross sectional view of the assembly of FIGURES 2 and 3 and is taken along section line 4—4 of FIGURE 3.

Referring first to FIGURE 1, the transmission assembly includes a power input shaft 10 which is drivably connected to the engine crankshaft in a suitable manner and a power output shaft 12 which may be mechanically coupled to the traction wheels. The power input shaft 10 may be drivably coupled to the power output shaft 12 by means of a series of planetary gear units generally identified in FIGURE 1 at 14, 16, 18 and 20, the planetary gear units 16 and 18 being effective to provide five different forward speed ratios and one reverse ratio. The planetary gear unit 14 provides an overdrive which may be combined with each of the individual ratios obtainable with planetary gear units 16 and 18 thereby doubling the number of ratios which can be obtained by means of the gear units 16 and 18 acting alone. The planetary gear unit 20 simply provides an added speed reduction for all of the ten forward ratios and the two reverse ratios made available by planetary gear units 14, 16 and 18.

The power take-off shaft is generally designated in FIGURE 1 by numeral 22 and a right angle drive 24 is provided for coupling the shaft 22 to a power take-off cross shaft which will be described in more particular detail in connection with FIGURE 5. The left end of the shaft 22 as viewed in FIGURE 1 is drivably coupled to the engine driven power input shaft 10 through a two-speed gear train generally identified by numeral 26. This gear train includes a fluid pressure operated multiple disc clutch 28 for drivably connecting and disconnecting the shaft 22 from the power input shaft 10. The right end of the shaft 22 as viewed in FIGURE 1 may be connected to the power output shaft 12 through gearing generally designated by numeral 30 to provide a ground speed interpreting source of power for the implements connected to the power take-off assembly. Such a compound power take-off coupling means makes it possible for the operator to operate the implements at speeds proportional in magnitude to engine speed or to operate such implements at speeds proportional in magnitude to the ground speed, whichever is desired. If it is desired to reduce or to increase engine speed for constant speed power take-off operation, an appropriate shift in the two-speed gear train may be made in order to maintain an optimum power take-off speed with the engine throttle at an adjusted setting.

The transmission assembly comprises a transmission casing 32 which includes an end wall 34 to which is secured an adapter plate 36. The adapter plate 36 covers a large diameter opening 38 formed in the wall 34 and it is apertured as shown at 40 to receive the power input shaft 10, the latter extending to the exterior of the transmission casing thereby permitting a coupling engagement between the engine crankshaft and the power input elements of the transmission.

The casing 32 is also formed with an internal wall 42 through which the power input shaft 10 extends and a pair of spaced bearings 44 and 46 is situated as shown for rotatably journaling the power input shaft 10 to the adapter plate 36 and to the internal wall 42, respectively.

A positive displacement fluid pump is generally shown in FIGURE 1 at 48 and it comprises a pump casing 50 secured to the outer side of the adapter plate 36 to define a substantially circular pump chamber within which a pump rotor 52 is situated. The rotor 52 is eccentrically positioned with respect to the cooperating pump chamber and carries pumping elements such as slippers or vanes for establishing a control pressure in a pump discharge port 54 formed in the adapter plate 36 as indicated, said port 54 communicating with the pump chamber in a conventional manner. Similarly, the adapter plate 36 is formed with a low pressure inlet port 56 communicating with the pump chamber at a lower pressure region. The rotor 52 is positively keyed or splined to the power input shaft 10 and is driven at engine speed during operation. The control pressure thus made available by the pump 48 may be utilized for control purposes by the control mechanism, not illustrated or described. The pump 48 also acts as a source of lubrication pressure.

The power input shaft 10 has formed thereon at an intermediate location an externally toothed clutch member 58 which is adapted to cooperate with an internally toothed shiftable clutch member 60. A pair of gears with differential pitch diameters is disposed in adjacent relationship with respect to clutch member 58 as indicated at 62 and 64. The gears 62 and 64 are each provided with integrally formed clutch teeth 66 and 68, respectively, which are adapted to cooperate with clutch member 60 to selectively connect either of the gears 62 or 64 to the power input shaft 10 as the clutch member 60 is moved in an axial direction. The gears 62 and 64 are adapted to rotate freely on power input shaft 10 whenever the clutch member 60 is out of engagement with the clutch teeth 66 or 68 as appropriate. The gears 62 and 64 form a portion of the power take-off drive assembly which will subsequently be described.

The power input shaft 10 extends into the interior region of the casing 32 and has positively splined thereto a planet gear carrier 70 for the planetary gear unit 14. The sun gear 72 for the planetary gear unit 14 is journaled on power input shaft 10 by means of suitable bushings and it defines an inner race for a one-way clutch 74, the latter forming a one-way driving connection between the inner race of sun gear 72 and an outer clutch race 76 which is a part of the carrier 70. Planet pinions 80 are carried by shafts 78 and are disposed in driving engagement with sun gear 72 and the ring gear 82 of the planetary gear unit 14. A brake drum 84 is keyed or splined to an extended portion of the sun gear 72 and a friction brake band 86 encircles the drum 84 in a conventional manner. Brake band 86 may be operated to selectively anchor brake drum 84 by means of a servo mechanism, not shown, which forms a part of the control system.

The sun gear 88 for the planetary gear unit 16 is rotatably journaled by suitable bushings on power input shaft 10 and is positively connected to ring gear 82 of the planetary unit 14. The carrier 90 for the planetary gear unit 16 is positively splined or keyed to an intermediate power delivery shaft 92 which extends axially of the transmission assembly in coaxial relationship with respect to power input shaft 10. The ring gear 94 for the planetary gear unit 16 may be clutched to the carrier 90 by means of the multiple disc clutch assembly shown at 96.

The clutch assembly 96 includes a drum 98 which defines a clutch working cylinder within which an annular piston 100 is slidably disposed. The ring gear 94 is positively coupled to the drum 98 as indicated and alternately spaced clutch discs of the clutch assembly are carried by the drum 98 while the remaining discs are carried by an extension 102 of the carrier 90. A clutch return spring 104 is disposed between the annular piston 100 and a spring backup member secured to the drum 98. A friction brake band 106 encircles the brake drum 98 and is adapted to be selectively applied for anchoring the brake drum 98. A suitable servo mechanism, not shown, is provided for this purpose.

The casing 32 has secured thereto a support member 108 having a centrally situated opening through which a sleeve shaft 110 is inserted. The shaft 110 rotatably journals the drum 98 by means of suitable bushings and it is formed with a series of grooves and ports forming a part of a fluid pressure system including lubrication pressure passages and control pressure passages. A second sleeve shaft 112 is coaxially journaled within sleeve shaft 110 and it is positively keyed or splined to the drum member 98 as shown at 114. The shaft 112 has further integrally formed thereon the sun gear 116 for the planetary gear unit 18.

The intermediate shaft 92 extends through sleeve shaft 112 and has splined thereto a compound clutch drum 118, the connection therebetween being shown at 120. The clutch drum 118 cooperates with the shaft 92 to define an annular working chamber 122 within which an annular piston 124 is slidably disposed, said piston 124 forming a part of a clutch assembly 126 adapted to drivably connect the clutch drum member 118 to the carrier 128 of the planetary gear unit 18. Planetary pinions 130 are journaled on pinion shafts 132 carried by the carrier 128, the latter including a brake drum 134. A friction brake band 136 encircles the drum 134 and is adapted to anchor the same when it is applied by a suitable brake operating servo. The brake drum 134 may be supported on an axial extension of the support member 108 by suitable bushings.

The ring gear 138 of the planetary gear unit 18 is formed on a torque transfer member 140 which in turn is splined to a radially extending portion 142 of the sun gear 144 for the planetary gear unit 20. This radially extending portion 142 may be clutched to drum 118 by a multiple disc clutch assembly 146. The drum 118 defines a working cylinder 148 within which is slidably positioned an annular piston 150 adapted to apply the multiple disc clutch pack for the clutch assembly 146.

As is readily apparent from an inspection of FIGURE 1, alternate ones of the clutch discs of the clutch assembly 126 are splined to an extension of the carrier 128 for the planetary gear unit 18 and the remaining clutch discs of this clutch assembly are splined to the drum member 118. The piston 124 will urge the cluutch discs into frictional driving engagement when fluid pressure is admitted to the right side thereof. A piston return spring 152 is interposed between the piston 124 and an anchor element carried by intermediate torque qdelivery shaft 92.

Similarly, alternate ones of the clutch discs for the assembly 146 are splined to the above-mentioned sun gear portion 142 and the remaining discs of the assembly 146 are splined to the drum 118. The annular piston 150 will apply the clutch pack when fluid pressure is admitted to the left side thereof and it will be retracted by a return spring 154 when the working pressure is exhausted, said spring 154 being disposed between the piston 150 and an anchor member secured to the radially inward part of the drum member 118.

The ring gear 156 of the planetary gear unit 20 is fixed to an end flange 158 of the transmission casing 32 and the carrier 160 of the planetary gear unit 20 is integrally joined to power output shaft 12. The carrier 160 carries planet pinion shafts 162 which have rotatably journaled thereon planet pinions 164 situated in engagement with sun gear 144 and ring gear 156.

An end plate 166 is secured to the flange 158 by bolts 168 and is provided with a bearing support portion 170 in which the power output shaft 12 is rotatably journaled.

The carrier 160 has secured thereto a drive gear 172 which is adapted to drivably engage a second gear 174, said gears 172 and 174 defining in part the gearing 30 which forms an auxiliary drive for the power take-off shaft 22.

The power take-off shaft 22 extends in a longitudinal direction through the transmission casing in parallel relationship with respect to the planetary gear elements previously described. A bearing cap 176 is secured to the plate 36 at the left side of the transmission assembly as viewed in FIGURE 1, and the left end of the power take-off shaft 22 is rotatably journaled in plate 36 by means of a bearing 178. A central portion of the bearing cap 176 is provided with an extension 180 which may be received within an axially extending bore formed in the end of the power take-off shaft 22 to provide oil transfer from the cap 176 to the shaft 22.

The two-speed gear train 26 comprises a gear member 182 which has formed thereon two gears of different pitch diameters as shown at 184 and 186. The gears 184 and 186, respectively, mesh with the aforementioned gears 62 and 64 and the gear member 182 defines an annular working cylinder within which an annular piston 188 is disposed. The gear member 182 is journaled on power take-off shaft 22 and a multiple clutch disc assembly is situated within the annular opening in gear member 182 for the purpose of forming a driving connection between gear member 182 and power take-off shaft 22. This is done in the instant embodiment by clutching the gears 184 and 186 to a bevel gear 190, the latter being splined or otherwise positively connected to the power take-off shaft 22. The annular piston 188 may be moved into engagement with the multiple disc clutch pack by means of fluid pressure applied to the left side of the piston 188, a return spring 194 being disposed between the piston 188 and a spring backup member as indicated for retracting the piston 188 to an inoperative position.

Fluid pressure may be admitted to the pressure chamber defined by the annular piston 188 and its cooperating annular cylinder through a pressure passage 196 formed in the shaft 22 and bearing adapter 176. The passage 196 communicates with a peripheral groove in the shaft 22 and with a presure port formed in the member 182. The multiple disc clutch assembly 28 may thus be applied to establish a driving connection between either one of the gears 62 or 64 and power take-off shaft 22.

As seen in FIGURE 1, the gear 174 on the right end of the power take-off shaft 22 is formed with a clutch portion having external clutch teeth 224 and a clutch element 226 is keyed or splined to shaft 22 adjacent the clutch teeth 224. The clutch element 226 is adapted to slide axially with respect to shaft 22 and it is formed with internal clutch teeth 228 capable of engaging clutch teeth 224 when it is moved in a right-hand direction as viewed in FIGURE 1. The clutch element 226 may be formed with a peripheral groove in which a shifter fork 230 is disposed.

The right end of the power take-off shaft 22 is journaled by bearing 232 positioned within a bearing retainer member 234 which in turn may be secured to the end plate 166 by bolts 236. An oil seal 238 is provided as shown and the end of the shaft 22 extends outwardly of the transmission casing so that an implement or accessory may be conveniently coupled to an extension shaft extending to the rear of the tractor.

By preference I have provided a pair of transverse power take-off shafts which are respectively geared to bevel gears 190 and 202. However, the power take-off shaft 22 and its associated clutch structure is the preferred power take-off arrangement and the transverse take-off shafts are merely supplementary in character.

The transmission herein described is capable of providing ten substantially evenly spaced forward driving speed ratios and two reverse speed ratios. The control assembly, not shown, is capable of selectively energizing the various transmission clutches and brakes to condition the transmission for the various operating speeds and it is further capable of permitting the vehicle operator to change from one operating speed ratio to another while the transmission is delivering power to the traction wheels without interrupting the flow of power. For purposes of convenience, the planetary gear unit 14 will be referred to as gear unit "A," the planetary gear unit 16 will be referred to as gear unit "B," the planetary gear unit 18 will be referred to as gear unit "C," the planetary gear unit 20 will be referred to as gear unit "D," the clutch assembly 146 will be referred to as the third clutch, the clutch assembly 28 will be referred to as the power take-off clutch, the brake band 86 will be referred to as the "first" brake, the brake band 106 will be referred to as the "second" brake, the brake band 136 will be referred to as the "third" brake, the clutch assembly 96 will be referred to as the "first" clutch and the clutch assembly 126 will be referred to as the "second" clutch.

To obtain the highest over-all gear reduction ratio, the third brake and the third clutch are both applied and the remaining brakes and clutches are released. It will be assumed for present purposes that the power take-off clutch and the manually operable clutch members 60 and 226 of the power take-off assembly are disengaged. It will therefore be apparent that the engine torque applied to power input shaft 10 will cause the ring gear 82 of the gear unit A to turn at engine speed since the one-way clutch 74 will lock the carrier 70 and the sun gear 72 together for joint rotation. The sun gear of gear unit B is driven at engine speed and the portion of the engine torque applied thereto is divided into two components, one components being transmitted by the shaft 92 and the applied third clutch to sun gear 144 of gear unit D. The other portion of the power applied to the sun gear of gear unit B will be transmitted through the ring gear of gear unit B and into the sun gear of gear unit C thus driving the latter in a reverse direction. Since the carrier of gear unit C is braked, the ring gear of gear unit C will be driven in a forward direction, and since the latter is coupled directly to the sun gear of gear unit D, the torque contribution of gear unit C will be added to the torque passing through the previously described power flow path and the resultant torque will be further multiplied by gear unit D. The carrier of gear unit D is joined to the power output shaft 12 as previously described. In one preferred embodiment of the transmission assembly, the over-all torque ratio thus obtained will be 37.6:1.

To obtain the second speed ratio the second clutch is applied and the third clutch is released, the third brake remaining applied and the remaining clutches and brakes remaining released. It is thus seen that the carrier for gear unit B is anchored by means of the applied second clutch and the applied brake C, the engine power delivered to the ring gear of gear unit B being transmitted in a reverse direction to the sun gear of gear unit C. Since the carrier of gear unit C is also braked by the third brake band, the ring gear of gear unit C will be driven in a forward direction at an increased torque ratio, and the resultant torque is transmitted to the sun gear of gear unit D and again multiplied by gear unit D. The over-all torque ratio obtained during second speed operation is 26.4:1 when the gear dimensions of the aforementioned preferred embodiment are employed.

To obtain third speed operation, the same clutches and brakes are used which were employed for first speed operation except that the first brake is energized. It is thus apparent that an initial overdrive will be obtained in gear unit A since the sun gear thereof is anchored thus causing the associated ring gear to be overspeeded with respect to the power input shaft 10, the one-way clutch 74 being adapted to overrun under these conditions. The over-all torque ratio will thus be equal to the product of the overdrive ratio obtained in the input unit and the combined ratio of gear units B, C and D. In the preferred embodiment of the transmission mechanism this over-all gear ratio is 24.4:1.

To obtain fourth speed operation the transmission is conditioned in a manner similar to that which was previously described in connection with second gear operation except that the first brake is energized. This produces an overdrive in gear unit A which is combined with the effective gear ratio of gear units B, C and D to produce an over-all gear ratio. In the instant preferred embodiment this ratio is 17.1:1.

Fifth speed operation may be obtained by applying the second brake and the third clutch while the remaining clutches and brakes are released. It is thus apparent that the one-way clutch 74 will cause the input gear unit to become locked up thereby causing the sun gear of gear unit B to be driven at engine speed. Since the second brake is applied, the ring gear of gear unit B acts as a reaction member and the carrier of gear unit B will be driven at an increased torque ratio. This carrier torque is transferred through the third clutch to the sun gear of gear unit D, the latter again multiplying the torque to produce an increased combined torque ratio which in the preferred embodiment is 11.2:1.

To obtain sixth speed operation the second clutch is applied and the third clutch is released. The other clutches and brakes will assume the condition previously described in connection with the fifth speed operation; that is, the second brake is applied while the first brake, the third brake, and the first clutch are released. The overrunning clutch 74 will again lock up the input gear unit to permit the sun gear of gear unit B to be driven at engine speed and since the ring gear of gear unit B is anchored by the second brake, the torque acting on the carrier of gear unit B will be transmitted through the second clutch to the carrier of gear unit C. Since the sun gear of gear unit C is anchored, the ring gear of gear unit C will be over-speeded and the resulting torque will be transmitted to the sun gear of gear unit D thus causing the carrier of gear unit D and the power output shaft to be driven. In the preferred embodiment the over-all gear ratio for sixth speed operation is 8.7:1.

To obtain seventh speed operation the transmission clutches and brakes may be conditioned in a manner similar to that described in connection with fifth speed operation except that the first brake is applied thus anchoring the sun gear of gear unit A. The ring gear of gear unit A is thus overspeeded and this overdrive ratio is combined with the ratio obtained in the main transmission gear units to produce an over-all ratio which is equal to the product of the fifth speed ratio and the overdrive ratio of the gear unit A. In the preferred embodiment this over-all torque ratio is 7.2:1.

Eighth speed operation may be obtained by conditioning the transmission clutches and brakes in a manner similar to that previously described in connection with the sixth speed operation except that the first brake is applied to again produce an overdrive in gear unit A. It is thus apparent that the over-all torque ratio for eighth speed operation will be equal to the product of the ratio for sixth speed operation and the overdrive ratio of gear unit A. In the preferred embodiment this combined torque ratio is equal to 5.6:1.

To obtain ninth speed operation, the first and second stage gear units are locked up for unitary movement. This is accomplished by applying the first clutch and the second clutch while the second and third brakes and the third clutch are released. The first brake is also released during ninth speed operation and gear unit A thus also assumes a locked up condition by reason of the operation of the one-way clutch 74. It is thus apparent that the sun gear of gear unit D will be driven at engine speed. The over-all torque ratio will therefore be equal to the ratio which is obtained by gear unit D acting alone. In the preferred embodiment this ratio is equal to 3.6:1.

Tenth speed operation is obtained by conditioning the transmission clutches and brakes in a manner similar to that previously described in connection with ninth speed operation except that the first brake is also applied. This produces an overdrive ratio in gear unit A which is combined with the reduction ratio obtained in gear unit D. In the preferred embodiment the product of these two ratios is 2.4:1.

The first reverse speed may be obtained by applying the first clutch and the third brake while the remaining clutches and brakes are released. Gear unit A assumes a locked up condition by reason of the operation of the one-way clutch 74. The first clutch is effective to lock up gear unit B and it is thus apparent that engine torque will be transmitted directly through gear unit A to drive the sun gear of gear unit C at engine speed. Since the carrier of gear unit C is anchored by the third brake, the ring gear of gear unit C will be driven in a reverse direction and this reverse torque will be multiplied by gear unit D. In the preferred embodiment the over-all gear ratio which may be thus obtained is equal to −12.7:1.

A second reverse gear ratio of reduced magnitude may be obtained by applying the first brake so that an overdrive will be obtained in gear unit A to cause the sun gear of gear unit C to be overspeeded with respect to the power input shaft. The ring gear of gear unit C is again driven in a reverse direction and the reverse torque is again multiplied by gear unit C to produce an over-all ratio equal to the product of the ratio obtained during operation in the first reverse operating range and the overdrive ratio of gear unit A. In the preferred embodiment this second reverse ratio is equal to −8.2:1.

The transmission assembly is further capable of providing a park condition whereby the traction wheels will be anchored to the transmission casing to prevent roll. This park condition is obtained when the second and third brakes are applied. It is thus seen that the carrier and the sun gear for gear unit C will both be anchored and any torque transferred in a reverse direction from the traction wheels through gear unit D will be transmitted directly from the ring gear of gear unit C to the transmission casing. However, it is emphasized that this park condition will permit the power input shaft to rotate freely without interference since there is no brake member acting on the same. Rotation of the power input shaft will cause gear unit A and the sun gear and carrier of gear unit B to idle freely, and since both the second clutch and the third clutch are released, the idling motion of the first stage carrier is not transmitted to the sun gear of gear unit D or to the carrier of gear unit C. This feature is of considerable importance in the farming industry since it makes possible the operation of implements and various accessories by means of the power take-off assembly while the tractor is in a park condition. The dangers caused by rolling of the tractor during operation of the power take-off are eliminated.

It is apparent from the foregoing that the carrier 128 for the planetary gear unit 18 is anchored during first and third speed operation and that the clutch discs of clutch assembly 126 which are carried by the carrier are also held stationary under these operating conditions. Further, compound clutch drum 118 is positively connected to shaft 92 as previously indicated and the clutch discs of the assembly 126 which are positively connected to drum 118 are carried by and rotate with drum 118. Alternate ones of the clutch discs of the assembly 126 are externally splined and they cooperate with internal splines carried by or formed on drum 118. The other discs of the assembly 126 are internally splined and are carried by external splines formed on an extension 240 which in turn forms a part of carrier 128. The internally splined discs and the externally splined discs are situated in alternating disposition and when they are urged into frictional contact a driving connection is establshed between carrier 128 and clutch drum 118.

During operation of the transmission in the first and third speed ranges, relative motion between the adjacent clutch discs of the clutch assembly 126 is established. This condition tends to cause frictional drag between the clutch discs thereby causing an excessive wear and lubrication of the clutch disc assembly 126 under these operating conditions is therefore necessary. Accordingly, I have provided a lubricating oil conduit for conducting lubricating oil to the central region of the space defined by extension 240 of the carrier 128. This conduit comprises one or more radial pasages 242 formed in shaft 92 which communicate with an annular pasage 244 defined by the hollow interior of shaft 92 and a cooperating pressure conducting tube 246. Pasage 244 in turn communicates with the central pressure manifold situated within support 108. Another tube 248 is concentrically disposed within tube 246 and defines therewith a control pressure passage extending from the central manifold to a radial passage 250 communicating with the working chamber for piston 124. Fluid pressure is distributed in this fashion to the clutch disc assembly 126 for energizing the same. In a similar fashion control pressure is distributed through tube 248 to a radial passage 252 extending to the working chamber associated with piston 150 and clutch disc assembly 146.

Referring next to FIGURES 2, 3 and 4, I have illustrated in more particular detail the basic carrier construction for planetary gear unit 18. This construction has been identified in FIGURES 2, 3 and 4 by numeral 128 in order to be consistent with the numeral used in the description of FIGURE 1, although the pinion shaft and planet gears for the carrier assembly have not been illustrated in FIGURES 2, 3 and 4.

Carrier construction 128 includes brake drum 134 as previously mentioned and it forms a part of an integral assembly which also includes the aforementioned extension 240 and a pinion shaft supporting portion disposed between brake drum 134 and extension 240.

The carrier 128 is comprised of radially spaced portions 254 and 256, the latter defining the aforementioned brake drum 134. The portions 254 and 256 are joined together by three equidistantly spaced webs 258, 260 and 262. Each web is formed with an axially extending opening of the type shown at 264 for the purpose of accommodating a pinion shaft upon which is journaled a planetary carrier pinion 130. The carrier 128 is formed with three recesses of the type shown at 266 in FIGURE 4 within which the individual planetary pinion gears 130 rotate. One of the three pinion shafts extends across each recess 266 and bridges the same.

The extension 240 is formed with external splines 268 for the purpose of forming a driving connection between internally splined clutch discs of the clutch disc assembly 126. Also, a plurality of longitudinal slots 270, preferably four or six in number, are formed in extension 240 for the purpose of permitting lubricating oil to be transferred from the interior of the carrier assembly to the region of the clutch discs.

Opening 272 is formed in the carrier for the purpose of receiving shaft 92 on which the carrier is journaled, as best seen in FIGURE 1.

During operation of the transmission mechanism in either third or first speed drive, the carrier 128 is braked and lubricating oil is thereby allowed to accumulate within the space defined by extension 240. This lubricating oil will then drain through one of the slots 270 and it will be transferred onto the friction surfaces for the clutch discs of the assembly 126. Since alternate ones of the clutch discs are rotating relative to the stationary discs, the lubricating oil will be carried around the assembly so that the entire friction surfaces of the clutch discs will be lubricated. Excess lubricating oil is thrown off in the usual manner and is returned to the transmission sump. It is thus apparent that an ample supply of lubricating oil is available at all times during operation in first or third speed drive and that all of the clutch discs will be uniformly lubricated.

What I claim and desire to secure by U.S. Letters Patent is:

1. A transmission having power input and output shafts, and means connecting said shafts providing a plurality of drives therebetween, said means including gearset means having a plurality of rotatable gear elements connected to said shafts, and selectively operable clutch and brake means operatively associated with said elements for conditioning said gearset means for said drives, said clutch means including radially inner and outer interleaved sets of axially spaced friction discs normally disengaged for a relative rotation therebetween, a hollow drum member secured to one of said elements and externally splined to said inner set of friction discs, said outer set of friction discs being rotatable with another of said elements, said brake means being engagable with said drum member to prevent rotation of said drum member and said one element and inner friction discs to condition said gearset means for one drive therethrough upon rotation of said another element and said second friction disc set, and means to lubricate all of said friction discs during relative rotation between said sets when said inner set is held stationary upon engagement of said brake means and disengagement of said clutch means, said latter means comprising a plurality of circumferentially spaced axially extending lubricant slots in said drum member internally of and radially aligned with said friction discs, said slots having an axial extent spanning all of said discs to lubricate all of said discs upon admission of lubricant to said slots, and means to supply cooling lubricant to the hollow interior of said drum for flow by gravity through some of said slots when said one element is stationary and said clutch means is disengaged to uniformly lubricate and cool all of said discs.

2. A transmission having power input and output shafts, and means connecting said shafts providing a plurality of drives therebetween, said means including gearset means having a plurality of rotatable gear elements connected to said shafts, and selectively operable clutch and brake means operatively associated with said elements for conditioning said gearset means for said drives, said clutch means including radially inner and outer interleaved sets of axially spaced friction discs normally disengaged for a relative rotation therebetween, a hollow drum member secured to one of said elements and externally splined to said inner set of friction discs, said outer set of friction discs being rotatable with another of said elements, said brake means being engagable with said drum member to prevent rotation of said drum member and said one element and inner friction discs to condition said gearset means for one drive therethrough upon rotation of said another element and said second friction disc set, and means to lubricate all of said friction discs during relative rotation therebetween when said inner set is held stationary upon engagement of said brake means and disengagement of said clutch means, said latter means comprising a plurality of circumferentially spaced axially extending lubricant slots in the periphery of said drum member located internally of and substantially radially aligned with said friction discs, said slots together spanning the axial extent of all of said discs to lubricate all of said discs upon admission of lubricant to said slots, and means to supply cooling lubricant to the hollow interior of said drum for flow by gravity through some of said slots when said one element is stationary and said clutch means is disengaged to uniformly lubricate and cool all of said discs simultaneously.

3. A transmission having power input and output shafts, and means connecting said shafts providing a plurality of drives therebetween, said means including a pair of planetary gearsets each having sun and ring gear members and a planet gear carrier member, means connecting said shafts to different ones of said members, and selectively operable clutch means and brake means operatively associated with said members for conditioning said gearsets for said drives, said clutch means including radially inner and outer interleaved sets of axially spaced friction discs, a hollow drum member secured to the carrier member of one of said gearsets and externally splined to said inner set of friction discs, said outer set of friction discs being rotatable with another member of said gearsets, said brake means being engageable with said drum member to prevent rotation of said drum member and said carrier member and said inner friction discs to condition said gearsets for one drive therethrough upon rotation of said another member and said second friction disc set, and means to lubricate said friction discs during relative rotation therebetween when said inner set is held stationary upon engagement of said brake means and disengagement of said clutch means, said latter means comprising a plurality of circumferentially spaced axially extending lubricant slots in the periphery of said drum member located internally of and substantially radially aligned with said friction discs, said slots together spanning the axial extent of all of said discs to lubricate all of said discs upon admission of lubricant to said slots, and means to supply cooling lubricant to the hollow interior of said drum for flow by gravity through said slots when said one member is stationary and said clutch means is disengaged to uniformly lubricate and cool all of said discs simultaneously.

References Cited in the file of this patent
UNITED STATES PATENTS

| | | |
|---|---|---|
| 2,728,429 | Kershner | Dec. 27, 1955 |
| 2,733,797 | Almen et al. | Feb. 7, 1956 |
| 2,775,331 | Peterson | Dec. 25, 1956 |
| 2,808,140 | Tromfimov | Oct. 1, 1957 |
| 2,886,983 | Miller | May 19, 1959 |
| 3,027,783 | Kelley | Apr. 3, 1962 |